(12) United States Patent
Tang

(10) Patent No.: US 10,912,113 B2
(45) Date of Patent: Feb. 2, 2021

(54) COMMUNICATION METHOD, TERMINAL DEVICE, AND NETWORK DEVICE

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/495,353

(22) PCT Filed: Mar. 24, 2017

(86) PCT No.: PCT/CN2017/078081
§ 371 (c)(1),
(2) Date: Sep. 18, 2019

(87) PCT Pub. No.: WO2018/170881
PCT Pub. Date: Sep. 27, 2018

(65) Prior Publication Data
US 2020/0107349 A1    Apr. 2, 2020

(51) Int. Cl.
*H04W 72/12* (2009.01)
*H04W 76/27* (2018.01)
(Continued)

(52) U.S. Cl.
CPC ..... *H04W 72/1289* (2013.01); *H04L 67/2842* (2013.01); *H04W 56/001* (2013.01); *H04W 72/0446* (2013.01); *H04W 76/27* (2018.02)

(58) Field of Classification Search
CPC ............. H04W 76/27; H04W 72/1289; H04W 56/001; H04W 72/0446; H04W 72/1205;
(Continued)

(56) References Cited

U.S. PATENT DOCUMENTS

2010/0091755 A1* 4/2010 Kwon ................... H04L 27/261
  370/344
2016/0295561 A1* 10/2016 Papasakellariou .... H04L 5/0094
(Continued)

FOREIGN PATENT DOCUMENTS

CN    102202400 A    9/2011
CN    102624507 A    8/2012
(Continued)

OTHER PUBLICATIONS

European Search Report dated Jun. 25, 2020 from Application No. 17902509.3-1215.
(Continued)

*Primary Examiner* — Syed Ali

(57) ABSTRACT

A communication method, a terminal device and a network device are provided. The communication method includes: receiving, by a terminal device, a first physical downlink control channel sent by a network device in a first time domain scheduling unit, wherein the first physical downlink control channel is used for scheduling a physical downlink data channel in at least one time domain scheduling unit before the first time domain scheduling unit; and receiving, by the terminal device, data corresponding to the first physical downlink control channel in the at least one time domain scheduling unit according to the first physical downlink control channel.

22 Claims, 10 Drawing Sheets

(51) Int. Cl.
*H04L 29/08* (2006.01)
*H04W 56/00* (2009.01)
*H04W 72/04* (2009.01)

(58) Field of Classification Search
CPC .... H04W 72/04; H04W 72/12; H04L 67/2842
See application file for complete search history.

(56) References Cited

U.S. PATENT DOCUMENTS

| | | | | |
|---|---|---|---|---|
| 2016/0330011 | A1* | 11/2016 | Lee | H04L 5/006 |
| 2017/0013565 | A1* | 1/2017 | Pelletier | H04W 72/0473 |
| 2017/0295601 | A1 | 10/2017 | Kim et al. | |
| 2018/0279325 | A1* | 9/2018 | Huang | H04L 43/10 |
| 2018/0279360 | A1* | 9/2018 | Park | H04L 5/0053 |
| 2019/0082431 | A1* | 3/2019 | Yi | H04L 5/0057 |
| 2019/0364529 | A1* | 11/2019 | Ko | H04L 5/0048 |
| 2020/0099499 | A1* | 3/2020 | Yeo | H04W 74/008 |
| 2020/0100221 | A1* | 3/2020 | Tang | H04J 11/0076 |
| 2020/0296673 | A1* | 9/2020 | Ouchi | H04J 1/00 |
| 2020/0305220 | A1* | 9/2020 | Iwai | H04W 76/25 |

FOREIGN PATENT DOCUMENTS

| | | |
|---|---|---|
| CN | 102781095 A | 11/2012 |
| CN | 102905370 A | 1/2013 |
| CN | 103312467 A | 9/2013 |
| WO | 2016028126 A1 | 2/2016 |

OTHER PUBLICATIONS

NTT DOCOMO et al: 3GPP Draft; R1-153181 Discussion on Discontinuous Transmission and Scheduling Final; 3rd Generation Partnership Project (3GPP); Mobile Competence Centre; F-06921 Sophia-Anti; vol. RAN WG1. No. Fukuoka. Japan; May 25, 2015-May 29, 2015 May 24, 2015 (May 24, 2015). XP050973773.
Mediatek Inc: 11 LAA frame structure design; 3GPP Draft; R1-153254 LAA Frame Structure Design. 3rd Generation Partnership Project; (3GPP). Mobile Competence Centre; 650; Route Des Lucioles; F-06921; Sophia-Antipolis Cedex; France; vol. RAN WG1. No. Fukuoka. Japan; May 25, 2015-May 29, 2015; May 24, 2015 (May 24, 2015); XP050970506.
Huawei et al: 11 DL control channel for LAA; 3GPP Draft; R1-152475. 3rd Generation Partnership Project (3GPP). Mobile Competence Centre; 650. Route Des Lucioles; F-06921 Sophia-Antipolis Cedex; France; vol. RAN WG1. No. Fukuoka. Japan; May 25, 2015-May 29, 2015; May 24, 2015 (May 24, 2015). XP050970932.
Interdigital Communications: "On Beam Management for Control and Data Channels"; 3GPP Draft; R1-1702324 on Beam Management for Control and Data Channels. 3rd Generation Partnership Project (3GPP); Mobile Competence Centre; 650. Route Des Lucioles; F-06921 Sophia-Antipolis Cedex; vol. RAN WG1. No. Athens. Greece; Feb. 13, 2017-Feb. 17, 2017; Feb. 12, 2017 (Feb. 12, 2017); XP051209478.
Partial Supplementary EP Search Report for EP application No. 17902509.3 dated Feb. 19, 2020.

* cited by examiner

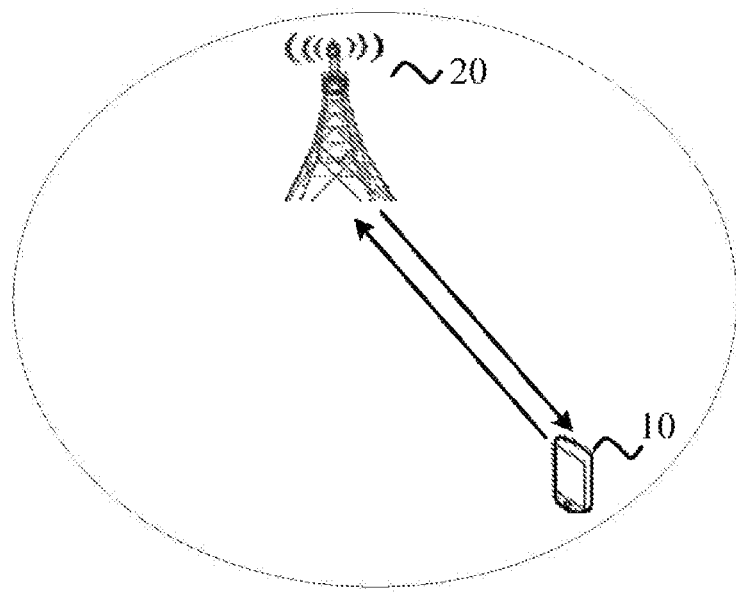

FIG. 1

100 | A terminal device receives a first physical downlink control channel sent by a network device in a first time domain scheduling unit, wherein the first physical downlink control channel is used for scheduling a physical downlink data channel in at least one time domain scheduling unit before the first time domain scheduling unit. ~110

The terminal device receives data corresponding to the first physical downlink control channel in the at least one time domain scheduling unit, according to the first physical downlink control channel. ~120

FIG. 2

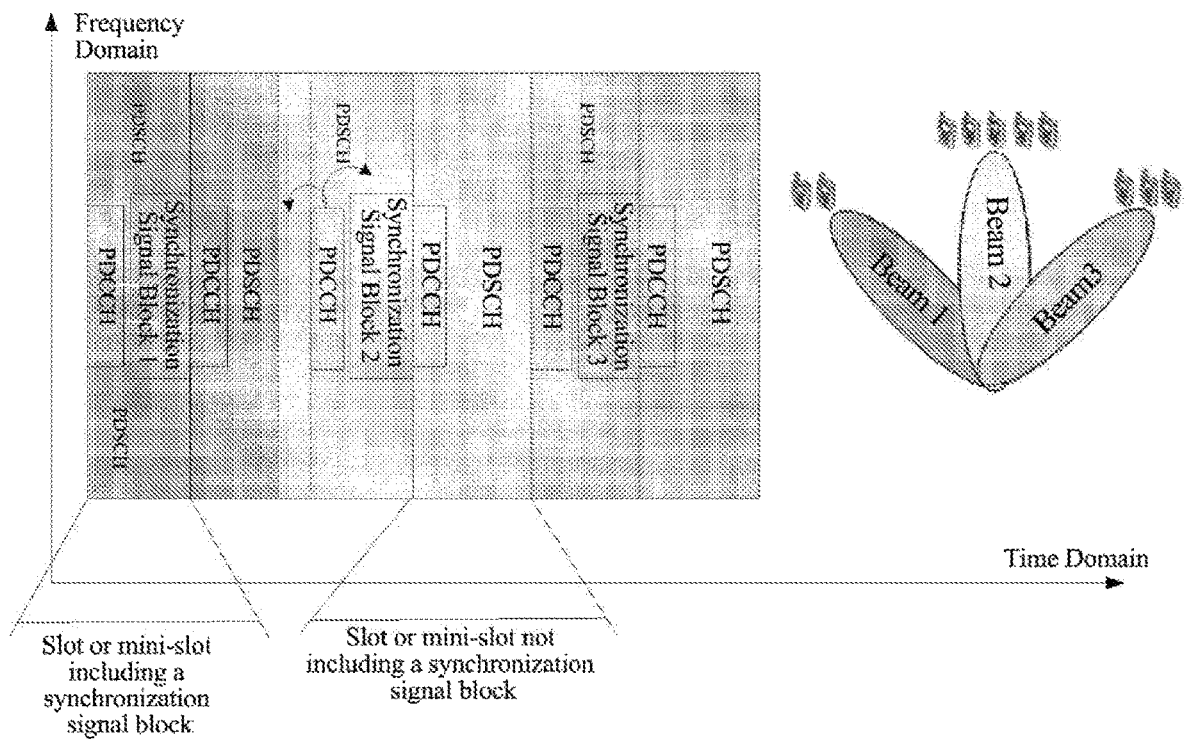

FIG. 6

200 | A terminal device receives first indication information and second indication information sent by a network device, wherein the first indication information is used for indicating a position of a first physical downlink control channel in a first time domain scheduling unit, the second indication information is used for indicating a position of a second physical downlink control channel in a second time domain scheduling unit, the first time domain scheduling unit includes a synchronization signal block, the second time domain scheduling unit does not include a synchronization signal block, and the synchronization signal block includes a synchronization signal and a physical broadcast channel. ~210

The terminal device determines a position of the first physical downlink control channel in the first time domain scheduling unit and a position of the second physical downlink control channel in the second time domain scheduling unit respectively, according to the first indication information and the second indication information. ~220

FIG. 7

COMMUNICATION METHOD, TERMINAL DEVICE, AND NETWORK DEVICE

CROSS-REFERENCE TO RELATED APPLICATION(S)

This application is a 371 application of International Application No. PCT/CN2017/078081, filed on Mar. 24, 2017, the entire disclosure of which is hereby incorporated by reference.

TECHNICAL FIELD

Implementations of the present disclosure relate to the field of communication, and more specifically, to a communication method, a terminal device and a network device.

BACKGROUND

In a Long Term Evolution (LTE) system, a time domain position of a Physical Downlink Control Channel (PDCCH) is completely fixed and located in first few symbols (up to 3) of each 1 ms subframe. Existing scheduling manners of PDCCHs may lead to a low utilization rate of network resources and may not be flexible enough.

SUMMARY

In view of this, implementations of the present disclosure provide a communication method, a terminal device and a network device.

In a first aspect, a communication method is provided, including: receiving, by a terminal device, a first physical downlink control channel sent by a network device in a first time domain scheduling unit, wherein the first physical downlink control channel is used for scheduling a physical downlink data channel in at least one time domain scheduling unit before the first time domain scheduling unit; and receiving, by the terminal device, data corresponding to the first physical downlink control channel in the at least one time domain scheduling unit, according to the first physical downlink control channel.

The time domain scheduling unit may be a time slot, a mini-time slot or a subframe, or may be a unit including some symbols. A time domain scheduling unit may include multiple symbols in a time domain, and may include multiple subcarriers or be an entire system bandwidth in a frequency domain.

The first physical downlink control channel is also used for scheduling a physical downlink data channel in the first time domain scheduling unit and/or a physical downlink data channel in at least one time domain scheduling unit after the first time domain scheduling unit.

A PDCCH can not only schedule resources of this time domain scheduling unit and following time domain scheduling units thereof, but also schedule partial resources of a previous time domain scheduling unit.

In a possible implementation mode, downlink control information carried on the first physical downlink control channel is used for indicating that the physical downlink data channel scheduled by the first physical downlink control channel is located in at least one time domain scheduling unit before the first time domain scheduling unit, and the method further includes: caching, by the terminal device, data carried on the physical downlink data channel capable of being scheduled by the first physical downlink control channel in the at least one scheduling unit; and receiving, by the terminal device, the data corresponding to the first physical downlink control channel in the at least one time domain scheduling unit, according to the first physical downlink control channel, includes: receiving, by the terminal device, the data corresponding to the first physical downlink control channel from the data carried on the physical downlink data channel capable of being scheduled by the first physical downlink control channel in the at least one scheduling unit cached by the terminal device, according to the first physical downlink control channel.

In a possible implementation mode, the method further includes: receiving, by the terminal device, indication information sent by the network device, wherein the indication information is used for indicating a position of the physical downlink data channel capable of being scheduled by the first physical downlink control channel in the at least one time domain scheduling unit; and caching, by the terminal device, the data carried on the physical downlink data channel capable of being scheduled by the first physical downlink control channel in the at least one scheduling unit, includes: caching, by the terminal device, the data carried on the physical downlink data channel capable of being scheduled by the first physical downlink control channel in the at least one scheduling unit, according to the indication information.

In a possible implementation mode, the indication information is carried in Radio Resource Control (RRC) signaling.

Optionally, the terminal device may cache information on the resources specified by a protocol in each time domain scheduling unit as specified by the protocol. If the terminal device receives in the next time domain scheduling unit an indication that a scheduled PDSCH is located within a PDCCH of the previous time domain scheduling unit, then the terminal device obtains data corresponding to the PDCCH in cached data.

In a possible implementation mode, the at least one time domain scheduling unit is a second time domain scheduling unit before and adjacent to the first time domain scheduling unit, the second time domain scheduling unit includes a second physical downlink control channel, the second time domain scheduling unit includes N symbols, and the physical downlink data channel capable of being scheduled by the first physical downlink control channel in the second time domain scheduling unit occupies N−M+1th to Nth symbols of the second time domain scheduling unit, which do not overlap with symbols occupied by the second physical downlink control channel, wherein N and M are both positive integers, and M≤N.

The physical downlink data channel capable of being scheduled by the first physical downlink control channel in the second time domain scheduling unit occupies N−M+1th to Nth symbols of the second time domain scheduling unit, which do not overlap with the symbols occupied by the second physical downlink control channel.

In a possible implementation mode, the first time domain scheduling unit includes a first synchronization signal block, the second time domain scheduling unit includes a second synchronization signal block, the first synchronization signal block is different from the second synchronization signal block, the second synchronization signal block occupies first to Pth symbols of the second time domain scheduling unit, and the second physical downlink control channel is located on at least one side of a bandwidth of the second synchronization signal block in the frequency domain, wherein P is a positive integer, and P≤(N−M).

In a possible implementation mode, the first time domain scheduling unit includes a first synchronization signal block, the first time domain scheduling unit includes Q symbols, the first synchronization signal block occupies Q−R+1th to Qth symbols of the first time domain scheduling unit, and the first physical downlink control channel occupies first to Sth symbols of the first time domain scheduling unit, wherein Q, R and S are all positive integers, and S≤(Q−R).

In a second aspect, a communication method is provided, including: sending, by a network device, a first physical downlink control channel to a terminal device in a first time domain scheduling unit, wherein the first physical downlink control channel is used for scheduling a physical downlink data channel in at least one time domain scheduling unit before the first time domain scheduling unit.

In a possible implementation mode, the method further includes: sending, by the network device, indication information to the terminal device, wherein the indication information is used for indicating a position of the physical downlink data channel capable of being scheduled by the first physical downlink control channel in the at least one time domain scheduling unit.

In a possible implementation mode, the at least one time domain scheduling unit is a second time domain scheduling unit before and adjacent to the first time domain scheduling unit, the second time domain scheduling unit includes a second physical downlink control channel, the second time domain scheduling unit includes N symbols, and the physical downlink data channel capable of being scheduled by the first physical downlink control channel in the second time domain scheduling unit occupies N−M+1th to Nth symbols of the second time domain scheduling unit, which do not overlap with symbols occupied by the second physical downlink control channel, wherein N and M are both positive integers, and M≤N.

In a possible implementation mode, the first time domain scheduling unit includes a first synchronization signal block, the second time domain scheduling unit includes a second synchronization signal block, the first synchronization signal block is different from the second synchronization signal block, the second synchronization signal block occupies first to Pth symbols of the second time domain scheduling unit, and the second physical downlink control channel is located on at least one side of a bandwidth of the second synchronization signal block in the frequency domain, wherein P is a positive integer, and P≤(N−M).

In a possible implementation mode, the first time domain scheduling unit includes a first synchronization signal block, the first time domain scheduling unit includes Q symbols, the first synchronization signal block occupies Q−R+1th to Qth symbols of the first time domain scheduling unit, and the first physical downlink control channel occupies first to Sth symbols of the first time domain scheduling unit, wherein Q, R, and S are all positive integers, and S≤(Q−R).

In a third aspect, a communication method is provided, including: receiving, by a terminal device, first indication information and second indication information sent by a network device, wherein the first indication information is used for indicating a position of a first physical downlink control channel in a first time domain scheduling unit, the second indication information is used for indicating a position of a second physical downlink control channel in a second time domain scheduling unit, the first time domain scheduling unit includes a synchronization signal block, the second time domain scheduling unit does not include a synchronization signal block, and the synchronization signal block includes a synchronization signal and a physical broadcast channel; and determining, by the terminal device, the position of the first physical downlink control channel in the first time domain scheduling unit and the position of the second physical downlink control channel in the second time domain scheduling unit respectively, according to the first indication information and the second indication information.

The time domain scheduling unit may be a time slot, a mini-time slot or a subframe, or may be a unit including some symbols. A time domain scheduling unit may include multiple symbols in a time domain, and may include multiple subcarriers or be an entire system bandwidth in a frequency domain.

In a possible implementation mode, the first indication information and/or the second indication information is carried in a physical broadcast channel or a system message.

Further, the first indication information and the second indication information may be carried in a broadcast channel in the first time domain scheduling unit.

In a possible implementation mode, the first time domain scheduling unit includes N symbols, the synchronization signal block occupies first to Mth symbols in the first time domain scheduling unit, wherein N and M are both positive integers, and M≤N, and the method further includes: receiving, by the terminal device, the second physical downlink control channel in the second time domain scheduling unit, after the terminal device receives completely the synchronization signal block and the first physical downlink control channel in the first time domain scheduling unit.

In a fourth aspect, a communication method is provided, including: sending, by a network device, first indication information and second indication information to a terminal device, wherein the first indication information is used for indicating a position of a first physical downlink control channel in a first time domain scheduling unit, the second indication information is used for indicating a position of a second physical downlink control channel in a second time domain scheduling unit, the first time domain scheduling unit comprises a synchronization signal block, and the second time domain scheduling unit does not comprise a synchronization signal block.

In a possible implementation mode, the first indication information and/or the second indication information is carried in a physical broadcast channel or a system message.

In a possible implementation mode, the first time domain scheduling unit includes N symbols, the synchronization signal block occupies first to Mth symbols in the first time domain scheduling unit, wherein N and M are both positive integers, and M≤N, and the method further includes: after the network device sends completely the synchronization signal block and the first physical downlink control channel in the first time domain scheduling unit, sending, by the network device, the second physical downlink control channel in the second time domain scheduling unit.

In a fifth aspect, a terminal device is provided, used for performing the method of above first aspect or the method in any possible implementation mode of the above first aspect. Specifically, the terminal device includes units for performing the method of above first aspect or the method in any possible implementation of the above first aspect.

In a sixth aspect, a network device is provided, used for performing the method in the above second aspect or any possible implementation mode of the second aspect. Specifically, the network device includes units used for performing the method in the second aspect or any possible implementation mode of the above second aspect.

In a seventh aspect, a terminal device is provided, used for performing the method of above third aspect or the method in any possible implementation mode of the above third aspect. Specifically, the terminal device includes units for performing the method of above third aspect or the method in any possible implementation mode of the above third aspect.

In an eighth aspect, a network device is provided, used for performing the method in the above fourth aspect or any possible implementation mode of the fourth aspect. Specifically, the network device includes units used for performing the method in the fourth aspect or any possible implementation mode of the above fourth aspect.

In a ninth aspect, a terminal device is provided, including a memory, a processor, an input interface and an output interface. The memory, the processor, the input interface and the output interface are connected through a bus system. The memory is used for storing instructions, and the processor is used for executing the instructions stored in the memory, to perform the method in the first aspect or any possible implementation mode of the above first aspect.

In a tenth aspect, a network device is provided, including a memory, a processor, an input interface and an output interface. The memory, the processor, the input interface and the output interface are connected through a bus system. The memory is used for storing instructions, and the processor is used for executing the instructions stored in the memory to perform the method in the second aspect or any possible implementation mode of the above second aspect.

In an eleventh aspect, a terminal device is provided, including a memory, a processor, an input interface and an output interface. The memory, the processor, the input interface and the output interface are connected through a bus system. The memory is used for storing instructions, and the processor is used for executing the instructions stored in the memory to perform the method in the third aspect or any possible implementation mode of the above third aspect.

In a twelfth aspect, a network device is provided, including a memory, a processor, an input interface and an output interface. The memory, the processor, the input interface and the output interface are connected through a bus system. The memory is used for storing instructions, and the processor is used for executing the instructions stored in the memory to perform the method in the fourth aspect or any possible implementation mode of the above fourth aspect.

In a thirteenth aspect, a computer storage medium is provided. The computer storage medium is used for storing computer software instructions for executing the method in the first aspect or any possible implementation mode of the above first aspect, the method in the second aspect or any possible implementation mode of the above second aspect, the method in the third aspect or any possible implementation mode of the above third aspect, the method in the fourth aspect or any possible implementation mode of the above fourth aspect, wherein the computer software instructions include programs designed for performing the above aspects.

These and other aspects of the present disclosure will be more readily understood in the following description of implementations.

BRIEF DESCRIPTION OF DRAWINGS

FIG. 1 shows a diagram of an application scenario according to an implementation of the present disclosure.

FIG. 2 shows a block diagram of a communication method of an implementation of the present disclosure.

FIG. 6 shows yet another structural diagram of a downlink time domain scheduling unit according to an implementation of the present disclosure.

FIG. 7 shows another block diagram of a communication method of an implementation of the present disclosure.

DETAILED DESCRIPTION

Figure 3:
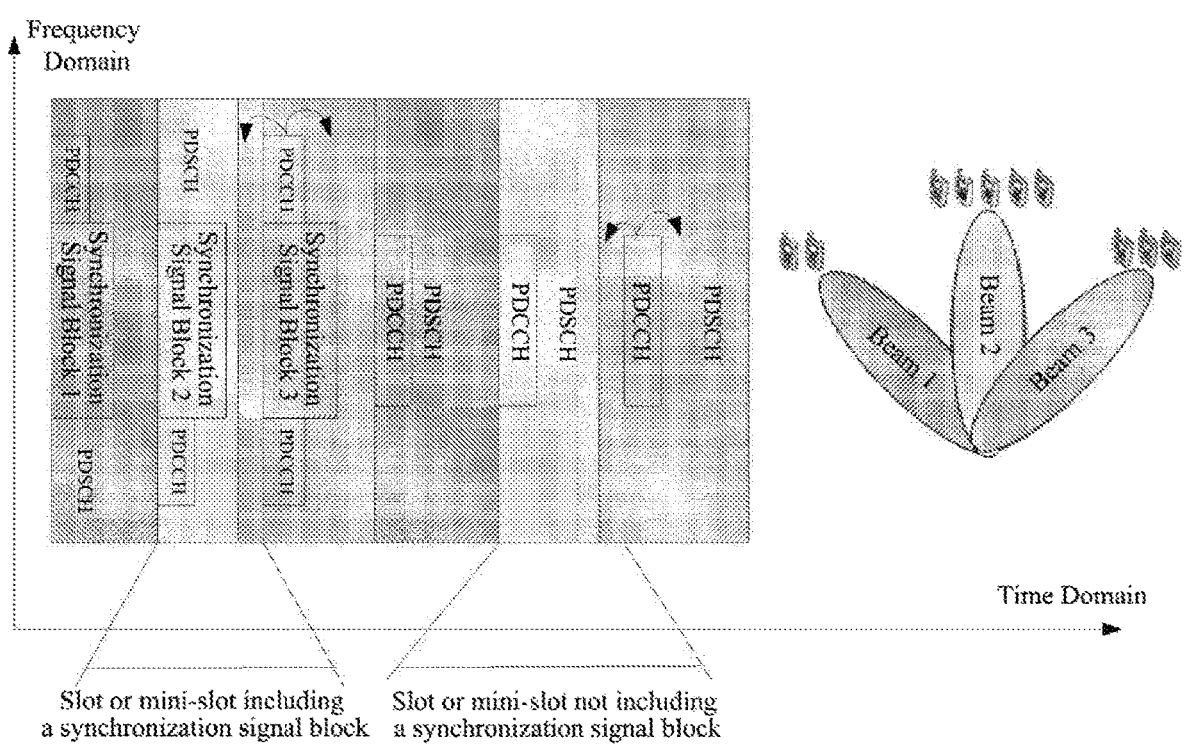
FIG. 3 shows a structural diagram of a downlink time domain scheduling unit according to an implementation of the present disclosure.

Technical solutions in implementations of the present disclosure will be clearly and completely described below with reference to the drawings in the implementations of the present disclosure.

It should be understood that the technical solutions of implementations of the present disclosure may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS) or a Worldwide Interoperability for Microwave Access (WiMAX) communication system, or a future 5G system.

In particular, technical solutions of implementations of the present disclosure may be applied to various communication systems based on non-orthogonal multiple access technologies, such as a Sparse Code Multiple Access (SCMA) system, a Low Density Signature (LDS) system. Of course, a SCMA system and a LDS system may also be referred to as other names in the field of communication. Further, technical solutions of implementations of the present disclosure may be applied to a multicarrier transmission system employing a non-orthogonal multiple access technology, such as an Orthogonal Frequency Division Multiplexing (OFDM) system based on a non-orthogonal multiple access technology, a Filter Bank Multi-Carrier (FBMC) system, a Generalized Frequency Division Multiplexing (GFDM) system, a Filtered OFDM (F-OFDM) system.

A terminal device in an implementation of the present disclosure may be referred to a User Equipment (UE), an access terminal, a subscriber unit, a subscriber station, a mobile station, a mobile site, a remote station, a remote terminal, a mobile equipment, a user terminal, a terminal, a wireless communication equipment, a user agent or a user apparatus. An access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or other processing device connected to a wireless modem, an on-board device, a wearable device, a terminal device in a future 5G network, or a terminal device in a Future Evolved Public Land Mobile Network (PLMN), etc., and implementations of the present disclosure are not limited thereto.

A network device in implementations of the present disclosure may be a device for communicating with a terminal device, wherein the network device may be a Base Transceiver Station (BTS) in a GSM system or a CDMA, or may be a NodeB (NB) in a WCDMA system, or may further be an Evolutional NodeB in an LTE system (eNB or eNodeB), or may further be a wireless controller in a scenario of a Cloud Radio Access Network (CRAN), or the network device may be a relay station, an access point, an on-board device, a wearable device, a network device in a future 5G network, or a network device in a future evolved PLMN network, etc., and implementations of the present disclosure are not limited thereto.

FIG. 1 is a diagram of an application scenario according to an implementation of the present disclosure. A communication system in FIG. 1 may include a terminal device 10 and a network device 20. The network device 20 is configured to provide communication services for the terminal device 10 and access a core network. The terminal device 10 accesses the network by searching for a synchronization signal, or a broadcast signal, etc., transmitted by the network device 20 to communicate with the network. Arrows shown in FIG. 1 may represent uplink/downlink transmission through cellular links between the terminal device 10 and the network device 20.

For ease of understanding, a basic communication flow between a terminal device and a network device is first briefly described. Specifically, a terminal device receives a Primary Synchronization Signal (PSS) and a Secondary Synchronization Signal (SSS) on several central frequency points of a possible cell after starting up to obtain frame synchronization, and then may read a PBCH. System information such as a system bandwidth, a Physical Hybrid ARQ Indicator Channel (PHICH) resource, the quantity of antennas, or a system frame number, may be obtained from the PBCH. A terminal device may also carry some other information in a system message, reside and use various services provided by the network device. If a network device has downlink data to send to a terminal device, the network device may first send a physical downlink control channel to the terminal device, the main role of which is to inform the terminal device that a Physical Downlink Shared Channel (PDSCH) allocated for the downlink data is arranged at which position in resource grids, and then the network device will send a PDSCH to the terminal device at the position allocated to the terminal device.

FIG. 2 shows a block diagram of a method 100 of wireless communication according to an implementation of the present disclosure. As shown in FIG. 2, the method 100 includes the following acts S110-S120.

In S110, a terminal device receives a first physical downlink control channel sent by a network device in a first time domain scheduling unit, wherein the first physical downlink control channel is used for scheduling a physical downlink data channel in at least one time domain scheduling unit before the first time domain scheduling unit.

In S120, the terminal device receives data corresponding to the first physical downlink control channel in the at least one time domain scheduling unit, according to the first physical downlink control channel.

It should be noted that, the time domain scheduling unit may be a time slot, a mini-time slot or a subframe, or may be a unit including some symbols; and a time domain scheduling unit may include multiple symbols in a time domain, and may include multiple subcarriers or be an entire system bandwidth in a frequency domain.

Specifically, the terminal device receives a PDCCH sent by the network device in a certain time domain scheduling unit. Usually, a PDCCH is used for carrying Download Control Information (DCI), and each terminal device corresponds to a PDCCH. The main role is to inform information about the terminal device, i.e. a PDSCH is arranged at which position in the resource grid. In an implementation of the present disclosure, the PDCCH may schedule a PDSCH in one or more time domain scheduling units before the certain time domain scheduling unit. In other words, if when the network device has downlink data to be transmitted after a PDCCH of a certain time domain scheduling unit, the terminal device may directly send a PDSCH after the time domain scheduling unit and perform scheduling through a PDCCH sent by a next time domain scheduling unit. Therefore, if when data in a former time domain scheduling unit and data in a later time domain scheduling unit are scheduled together in the later time domain scheduling unit but resources are not enough, a network needs to allocate a further time-domain scheduling unit to transmit the data. If the network device makes full use of the resources of the former time-domain scheduling unit, it may not be necessary for a network to allocate a further time-domain scheduling unit, thus effectively improving a utilization rate of network resources and realizing more flexible scheduling.

It should be understood that the above description takes a time domain scheduling unit before the present time domain scheduling unit as an example, and implementations of the present disclosure are not limited thereto, or several time domain scheduling units before the present time domain scheduling unit may also be taken as an example.

Optionally, in an implementation of the present disclosure, downlink control information carried on the first physical downlink control channel is used for indicating that the physical downlink data channel scheduled by the first physical downlink control channel is located in at least one time domain scheduling unit before the first time domain scheduling unit. And the method further includes: caching, by the terminal device, data carried on the physical downlink data channel capable of being scheduled by the first physical downlink control channel in the at least one scheduling unit. Receiving, by the terminal device, the data corresponding to the first physical downlink control channel in the at least one time domain scheduling unit, according to the first physical downlink control channel, includes: obtaining, by the terminal device, the data corresponding to the first physical downlink control channel from the data carried on the physical downlink data channel capable of being scheduled by the first physical downlink control channel in the at least one scheduling unit cached by the terminal device, according to the first physical downlink control channel.

Specifically, the terminal device may cache information on the resources specified by a protocol in each time domain scheduling unit, as specified by the protocol. If the terminal device receives in the next time domain scheduling unit an indication that a scheduled PDSCH is located within a PDCCH of the previous time domain scheduling unit, then the terminal device obtains data corresponding to the PDCCH in cached data. The terminal device may also inform a position of a PDSCH in a previous time domain scheduling unit capable of being scheduled by a PDCCH in a next time domain scheduling unit, through a semi-static configuration of the network device. Similarly, the terminal device may cache data on a PDSCH in a previous time domain scheduling unit. If the terminal device receives an indication in a next time domain scheduling unit that a scheduled PDSCH is located within a PDCCH in the previous time domain scheduling unit, then the terminal device obtains data corresponding to the PDCCH from cached data. It should be understood that the semi-static configuration may be Radio Resource Control (RRC).

Optionally, in an implementation of the present disclosure, the at least one time domain scheduling unit is a second time domain scheduling unit before and adjacent to the first time domain scheduling unit, the second time domain scheduling unit includes a second physical downlink control channel, the second time domain scheduling unit includes N symbols, and the physical downlink data channel capable of being scheduled by the first physical downlink control channel in the second time domain scheduling unit occupies N−M+1th to Nth symbols of the second time domain scheduling unit, which do not overlap with symbols occupied by the second physical downlink control channel, wherein N and M are both positive integers, and M≤N.

The physical downlink data channel capable of being scheduled by the first physical downlink control channel in the second time domain scheduling unit occupies N−M+1th to Nth symbols of the second time domain scheduling unit, which do not overlap with the symbols occupied by the second physical downlink control channel, this would not cause conflicts of resources, thus improving transmission performances of a system.

Further, the first time domain scheduling unit includes a first synchronization signal block, the second time domain scheduling unit includes a second synchronization signal block, the first synchronization signal block is different from the second synchronization signal block, the second synchronization signal block occupies first to Pth symbols of the second time domain scheduling unit, and the second physical downlink control channel is located on at least one side of a bandwidth of the second synchronization signal block in a frequency domain, P is a positive integer, and P≤(N−M).

Optionally, the second synchronization signal block and the second physical downlink control channel may overlap partially or completely in the time domain. For example, the second synchronization signal block occupies first P symbols, the first physical downlink control channel is on a side of a bandwidth of the first synchronization signal block, and also occupies the first P symbols of a first time slot or a first mini-time slot, or may occupy the first M symbols, with P≥M.

The synchronization signal block is configured in a first few symbols of the time domain scheduling unit for transmission, so that the terminal can read downlink control channel and system information of a current time slot immediately after completing cell search, time for a terminal to access a network can be shortened, and power consumption in a process for a terminal to access a network can be saved.

Further, the first time domain scheduling unit includes a first synchronization signal block, the first time domain scheduling unit includes Q symbols, the first synchronization signal block occupies Q−R+1th to Qth symbols of the first time domain scheduling unit, and the first physical downlink control channel occupies first to Sth symbols of the first time domain scheduling unit, wherein Q, R and S are positive integers, and S≤(Q−R).

Optionally, the first synchronization signal block and the first physical downlink control channel may or may not overlap in the frequency domain. Specifically, the first synchronization signal block may be configured in the center of a system bandwidth of the first time domain scheduling unit and occupy last few symbols of the first time domain scheduling unit. Similarly, the first physical downlink control channel may be configured in the center of a bandwidth of the first time domain scheduling unit and occupy first few symbols of the first time domain scheduling unit.

Further, the first physical downlink control channel is also used for scheduling a physical downlink data channel in the first time domain scheduling unit and/or a physical downlink data channel in at least one time domain scheduling unit after the first time domain scheduling unit.

Next, four kinds of structures of a downlink time domain scheduling unit of implementations of the present disclosure which can be implemented will be described in detail with reference to FIG. 3 to FIG. 6.

Implementation One

As shown in FIG. 3, a synchronization signal block is transmitted at a head of a slot or a mini-slot longer than the synchronization signal block, and a PDCCH is transmitted at a symbol where the synchronization signal block is located, occupying frequency domain resources on both sides of a bandwidth of the synchronization signal block. Wherein the PDCCH may be located on a side or both sides of the synchronization signal block. A PDCCH in a time slot or a mini-time slot not including a synchronization signal block occupies first few symbols in the time slot or mini-time slot where the PDCCH is located. A PDCCH in a time slot or a mini-time slot including a synchronization signal block and a PDCCH in a time slot or a mini-time slot not including a synchronization signal block may schedule a PDSCH in this time slot or this mini-time slot, may schedule a PDSCH after this time slot or this mini-time slot, and may schedule a PDSCH before this time slot or this mini-time slot. Time slots or mini-time slots including synchronization signal blocks of various beams are transmitted continuously, and a time slot or a mini-time slot including a synchronization signal block and a time slot or mini-time slot not including a synchronization signal block of a certain beam are transmitted discontinuously.

A PDCCH may schedule a PDSCH in other time slots or mini-time slots before this time slot or this mini-time slot, wherein the other time slots or mini-time slots may be time slots or mini-time slots including synchronization signal blocks, or time slots or mini-time slots not including synchronization signal blocks.

Implementation Two

Figure 4:
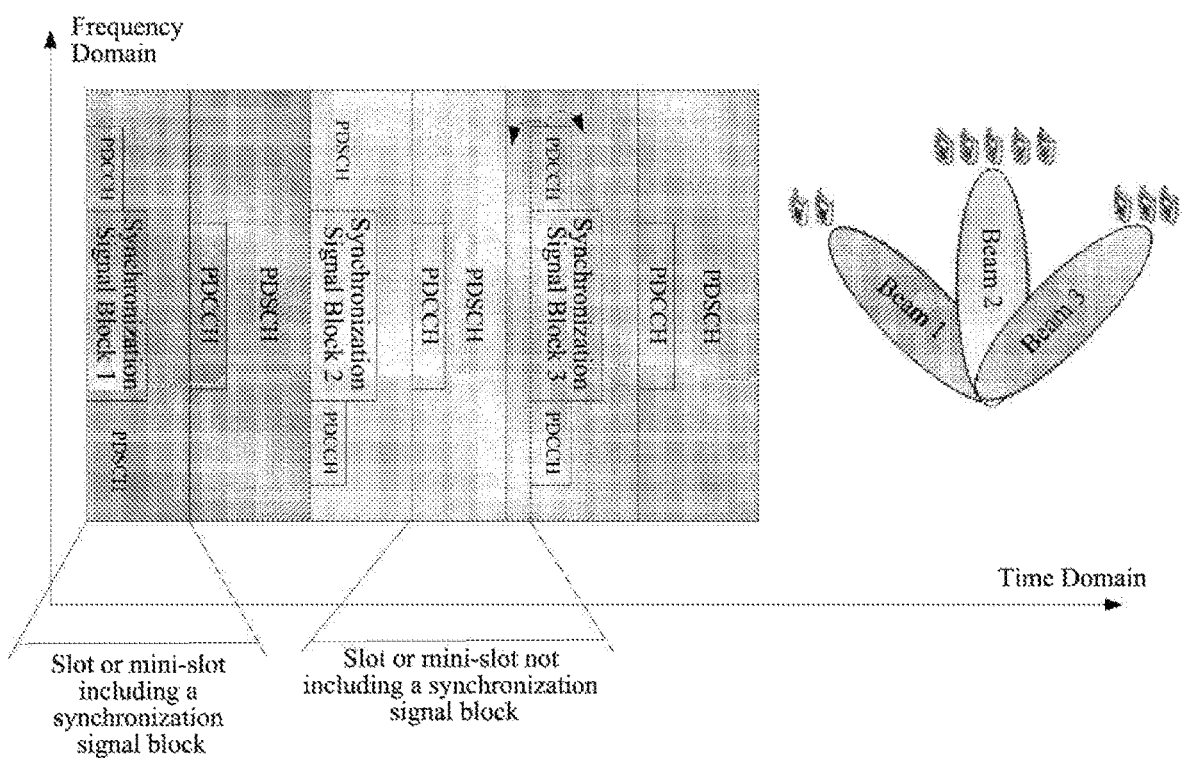
FIG. 4 shows another structural diagram of a downlink time domain scheduling unit according to an implementation of the present disclosure.

As shown in FIG. 4, a synchronization signal block is transmitted at a head of a slot or a mini-slot longer than the synchronization signal block, and PDCCH is transmitted at a symbol where the synchronization signal block is located, occupying frequency domain resources on both sides of a bandwidth of the synchronization signal block. Wherein the PDCCH may be located on a side or both sides of the synchronization signal block. A PDCCH in a time slot or a mini-time slot not including a synchronization signal block occupies first few symbols in a time domain scheduling unit where the PDCCH is located. A PDCCH in a time slot or a mini-time slot including a synchronization signal block and a PDCCH in a time slot or a mini-time slot not including a synchronization signal block may schedule a PDSCH in this time slot or this mini-time slot, may schedule a PDSCH after this time slot or this mini-time slot, and may schedule a PDSCH before this time slot or this mini-time slot. Time slots or mini-time slots including synchronization signal blocks of various beams are transmitted discontinuously, and a time slot or a mini-time slot including a synchronization signal block and a time slot or mini-time slot not including a synchronization signal block of a certain beam are transmitted continuously.

Implementation Three

Figure 5:
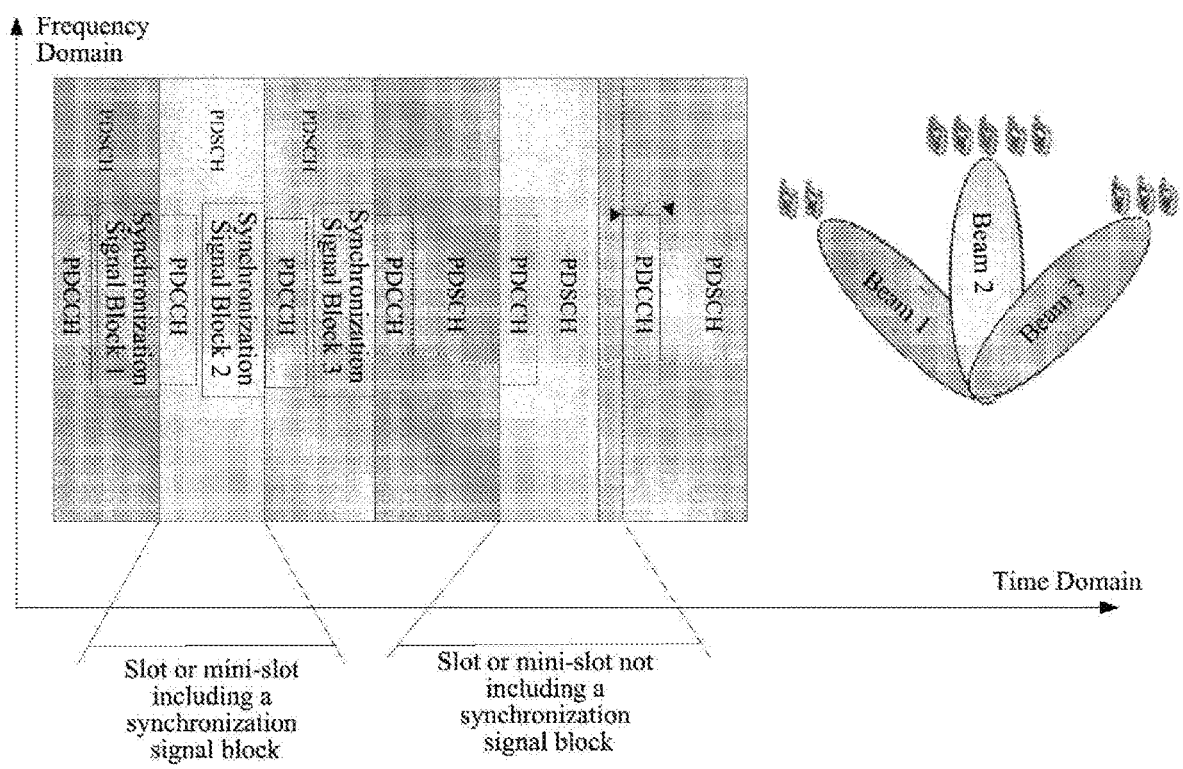
FIG. 5 shows yet another structural diagram of a downlink time domain scheduling unit according to an implementation of the present disclosure.

As shown in FIG. 5, a synchronization signal block is transmitted at an end of a slot or a mini-slot longer than the synchronization signal block, PDCCH is transmitted at a head of the slot or the mini-slot, and the synchronization signal block and the PDCCH occupy different symbols. In this implementation, time slots or mini-time slots including synchronization signal blocks of various beams are transmitted continuously first, and then time slots or mini-time slots not including synchronization signal blocks of various beams are transmitted. A PDCCH in a time slot or a mini-time slot not including a synchronization signal block may schedule a PDSCH in this time slot or this mini-time slot, may schedule a PDSCH after this time slot or this mini-time slot, and may schedule a PDSCH before this time slot or this mini-time slot.

Implementation Four

As shown in FIG. 6, a synchronization signal block is transmitted at an end of a slot or a mini-slot longer than the synchronization signal block, a PDCCH is transmitted at a head of the slot or the mini-slot, and the synchronization signal block and the PDCCH occupy different symbols. The difference from Implementation Nine is that time slots or mini-slots including synchronization signal blocks of various beams are transmitted discontinuously, and a time slot or a mini-slot including a synchronization signal block and a time slot or a mini-slot not including a synchronization signal block of a certain beam are transmitted continuously. A PDCCH in a time slot or a mini-time slot including a synchronization signal block may schedule a PDSCH in this time slot or this mini-time slot, may schedule a PDSCH after this time slot or this mini-time slot, and may schedule a PDSCH before this time slot or this mini-time slot.

The PDCCH in the above implementation can schedule not only resources of this time slot or mini-slot and a subsequent time slot or mini-slot, but also partial resources of a previous time slot or mini-slot. In this way, PDSCH transmission resources of the beam can be expanded, without allocating a new time slot or mini-time slot for the beam. The flexibility of resource scheduling is further improved.

FIG. 7 shows a block diagram of a method 200 of wireless communication according to an implementation of the present disclosure. As shown in FIG. 7, the method 200 includes the following acts S210-S220.

In S210, a terminal device receives first indication information and second indication information sent by a network device, wherein the first indication information is used for indicating a position of a first physical downlink control channel in a first time domain scheduling unit, the second indication information is used for indicating a position of a second physical downlink control channel in a second time domain scheduling unit, the first time domain scheduling unit includes a synchronization signal block, the second time domain scheduling unit does not include a synchronization signal block, and the synchronization signal block includes a synchronization signal and a physical broadcast channel.

In S220, the terminal device determines a position of the first physical downlink control channel in the first time domain scheduling unit and a position of the second physical downlink control channel in the second time domain scheduling unit respectively, according to the first indication information and the second indication information.

It should be noted that, the time domain scheduling unit may be a time slot, a mini-time slot or a subframe, or may be a unit including some symbols. A time domain scheduling unit may include multiple symbols in a time domain, and may include multiple subcarriers or be an entire system bandwidth in a frequency domain.

Specifically, a part of resources may be simultaneously configured in a time domain scheduling unit including a synchronization signal block, to transmit a physical downlink control channel. As mentioned above, in an LTE system, a physical downlink control channel is in a first few symbols of a subframe, while a synchronization signal and a PBCH are respectively in different time slots and a frequency domain is located in 72 subcarriers in the center of a system bandwidth. However, in an NR system, a time domain scheduling unit is no longer a subframe, but may be a time slot or a mini-time slot, etc. and a bandwidth of the system will become larger. If a configuration mode of time domain scheduling units in an LTE system is still adopted, then other positions in a frequency domain of time domain scheduling units including synchronization signals would be wasted. While if a part of resources are configured in time domain scheduling units transmitting synchronization signal blocks to transmit downlink control channels, but physical downlink control channels in time domain scheduling units that do not include synchronization signal blocks may adopt an original structure with small structural changes, so that a resource utilization rate can be improved, a transmission time of each beam can be shortened, a transmission delay can be reduced, and more beams can be accommodated while coverage requirements of NR high frequency bands are satisfied, thereby improving a capacity and coverage of a communication system.

Optionally, the first indication information and/or the second indication information is carried in a physical broadcast channel or a system message. Further, the first indication information and the second indication information may be carried in a broadcast channel in the first time domain scheduling unit.

Optionally, in an implementation of the present disclosure, the first time domain scheduling unit includes N symbols, the synchronization signal block occupies first to Mth symbols in the first time domain scheduling unit, wherein N and M are both positive integers, and M≤N, and the method further includes: receiving, by the terminal device, the second physical downlink control channel in the second time domain scheduling unit, after the terminal device receives completely the synchronization signal block and the first physical downlink control channel in the first time domain scheduling unit.

Figure 8:
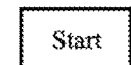
FIG. 8 shows yet another block diagram of a communication method of an implementation of the present disclosure.

FIG. 8 shows a flow chart of a communication method 300 according to an implementation of the present disclosure. As shown in FIG. 8, the method 300 includes the following an act S310.

In S310, a network device sends a first physical downlink control channel to a terminal device in a first time domain scheduling unit, wherein the first physical downlink control channel is used for scheduling a physical downlink data channel in at least one time domain scheduling unit before the first time domain scheduling unit.

Therefore, with the communication method of an implementation of the present disclosure, a PDCCH can not only schedule resources of this time domain scheduling unit and its subsequent time domain scheduling unit, but also schedule partial resources of a previous time domain scheduling unit. In this way, PDSCH transmission resources of the beam can be expanded, without allocating a new time domain scheduling unit for the beam. The flexibility of resource scheduling is further improved.

Optionally, in an implementation of the present disclosure, the method further includes: sending, by the network device, indication information to the terminal device, wherein the indication information is used for indicating a position of the physical downlink data channel capable of being scheduled by the first physical downlink control channel in the at least one time domain scheduling unit.

Optionally, in an implementation of the present disclosure, the indication information is carried in Radio Resource Control (RRC) signaling.

Optionally, in an implementation of the present disclosure, the at least one time domain scheduling unit is a second time domain scheduling unit before and adjacent to the first time domain scheduling unit, the second time domain scheduling unit includes a second physical downlink control channel, the second time domain scheduling unit includes N symbols, and the physical downlink data channel capable of being scheduled by the first physical downlink control channel in the second time domain scheduling unit occupies N−M+1th to Nth symbols of the second time domain scheduling unit, which do not overlap with symbols occupied by the second physical downlink control channel, wherein N and M are both positive integers, and M≤N.

Optionally, in an implementation of the present disclosure, the first time domain scheduling unit includes a first synchronization signal block, the second time domain scheduling unit includes a second synchronization signal block, the first synchronization signal block is different from the second synchronization signal block, the second synchronization signal block occupies first to Pth symbols of the second time domain scheduling unit, and the second physical downlink control channel is located on at least one side of a bandwidth of the second synchronization signal block in the frequency domain, wherein P is a positive integer, and P≤(N−M).

Optionally, in an implementation of the present disclosure, the first time domain scheduling unit includes a first synchronization signal block, the first time domain scheduling unit includes Q symbols, the first synchronization signal block occupies Q−R+1th to Qth symbols of the first time domain scheduling unit, and the first physical downlink control channel occupies first to Sth symbols of the first time domain scheduling unit, wherein Q, R, and S are all positive integers, and S≤(Q−R).

Optionally, in an implementation of the present disclosure, the first time domain scheduling unit is a time slot or a mini-time slot.

Optionally, in an implementation of the present disclosure, the first physical downlink control channel is further used for scheduling a physical downlink data channel in the first time domain scheduling unit and/or a physical downlink data channel in at least one time domain scheduling unit after the first time domain scheduling unit.

Figure 9:
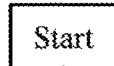
FIG. 9 shows yet another block diagram of a communication method of an implementation of the present disclosure.

FIG. 9 shows a flow chart of a communication method 400 according to an implementation of the present disclosure. As shown in FIG. 9, the method 400 includes the following act S410.

In S410, a network device sends first indication information and second indication information to a terminal device, wherein the first indication information is used for indicating a position of a first physical downlink control channel in a first time domain scheduling unit, the second indication information is used for indicating a position of a second physical downlink control channel in a second time domain scheduling unit, the first time domain scheduling unit includes a synchronization signal block, and the second time domain scheduling unit does not include a synchronization signal block.

Therefore, with the communication method of an implementation of the present disclosure, a resource utilization rate can be improved, a transmission time of each beam can be shortened, a transmission delay can be reduced, and more beams can be accommodated while coverage requirements of NR high frequency bands are satisfied, thereby improving a capacity and coverage of a communication system.

Optionally, in an implementation of the present disclosure, the first indication information and/or the second indication information is carried in a physical broadcast channel or a system message.

Optionally, in an implementation of the present disclosure, the first time domain scheduling unit includes N symbols, the synchronization signal block occupies first to Mth symbols in the first time domain scheduling unit, wherein N and M are both positive integers, and M≤N, and the method further includes: sending, by the network device, the second physical downlink control channel in the second time domain scheduling unit, after the network device sends completely the synchronization signal block and the first physical downlink control channel in the first time domain scheduling unit.

Optionally, in an implementation of the present disclosure, the first time domain scheduling unit and/or the second time domain scheduling unit is a time slot or a mini-time slot.

It should be understood that interaction between the network device and the terminal device, and related characteristics, functions of the network device, etc., described by the network device correspond to related characteristics and functions of the terminal device. In other words, what information the terminal device sends to the network device, what information the network device will receive accordingly. For the sake of conciseness, it will not be repeated here.

It should be understood that in various implementations of the present disclosure, values of sequence numbers in the aforementioned processes do not indicate an order of execution, and the order of execution of various processes should be determined by their functions and internal logics, and should not constitute any limitation on implementation processes of implementations of the present disclosure.

Figure 10:
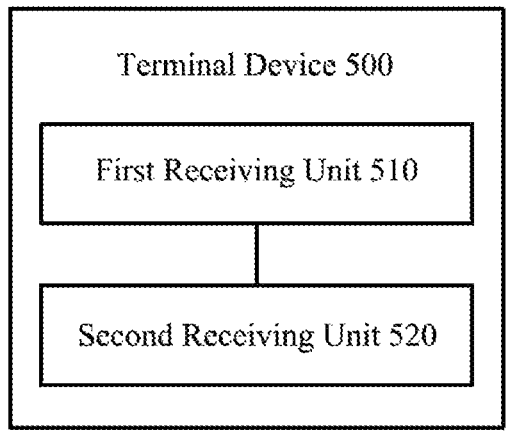
FIG. 10 shows a block diagram of a terminal device according to an implementation of the present disclosure.

FIG. 10 shows a block diagram of a terminal device 500 according to an implementation of the present disclosure. As shown in FIG. 10, the terminal device 500 includes a first receiving unit 510 and a second receiving unit 520.

The first receiving unit 510 is used for receiving a first physical downlink control channel sent by a network device in a first time domain scheduling unit, wherein the first physical downlink control channel is used for scheduling a physical downlink data channel in at least one time domain scheduling unit before the first time domain scheduling unit.

The second receiving unit 520 is used for receiving data corresponding to the first physical downlink control channel in the at least one time domain scheduling unit, according to the first physical downlink control channel.

Optionally, in an implementation of the present disclosure, downlink control information carried on the first physical downlink control channel is used for indicating that the physical downlink data channel scheduled by the first physical downlink control channel is located in at least one time domain scheduling unit before the first time domain scheduling unit, and the terminal device 500 further includes: a caching unit 530, used for caching data carried on the physical downlink data channel capable of being scheduled by the first physical downlink control channel in the at least one scheduling unit; and the second receiving unit 520 is specifically used for receiving data corresponding to the first physical downlink control channel from the data carried on the physical downlink data channel capable of being scheduled by the first physical downlink control channel in the at least one scheduling unit cached by the terminal device, according to the first physical downlink control channel.

Optionally, in an implementation of the present disclosure, the terminal device 500 further includes: a third receiving unit 540, used for receiving indication information sent by the network device, wherein the indication information is used for indicating a position of the physical downlink data channel capable of being scheduled by the first physical downlink control channel in the at least one time domain scheduling unit; and the caching unit 530 is specifically used for caching the data carried on the physical downlink data channel capable of being scheduled by the first physical downlink control channel in the at least one scheduling unit, according to the indication information.

Optionally, in an implementation of the present disclosure, the indication information is carried in Radio Resource Control (RRC) signaling.

Optionally, in an implementation of the present disclosure, the at least one time domain scheduling unit is a second time domain scheduling unit before and adjacent to the first time domain scheduling unit, the second time domain scheduling unit includes a second physical downlink control channel, the second time domain scheduling unit includes N symbols, and the physical downlink data channel capable of being scheduled by the first physical downlink control channel in the second time domain scheduling unit occupies N−M+1th to Nth symbols of the second time domain scheduling unit, which do not overlap with symbols occupied by the second physical downlink control channel, wherein N and M are both positive integers, and M≤N.

Optionally, in an implementation of the present disclosure, the first time domain scheduling unit includes a first synchronization signal block, the second time domain scheduling unit includes a second synchronization signal block, the first synchronization signal block is different from the second synchronization signal block, the second synchronization signal block occupies first to Pth symbols of the second time domain scheduling unit, and the second physical downlink control channel is located on at least one side of a bandwidth of the second synchronization signal block in the frequency domain, wherein P is a positive integer, and P≤(N−M).

Optionally, in an implementation of the present disclosure, the first time domain scheduling unit includes a first synchronization signal block, the first time domain scheduling unit includes Q symbols, the first synchronization signal block occupies Q−R+1th to Qth symbols of the first time domain scheduling unit, and the first physical downlink control channel occupies first to Sth symbols of the first time domain scheduling unit, wherein Q, R, and S are all positive integers, and S≤(Q−R).

Optionally, in an implementation of the present disclosure, the first time domain scheduling unit is a time slot or a mini-time slot.

Optionally, in an implementation of the present disclosure, the first physical downlink control channel is further used for scheduling a physical downlink data channel in the first time domain scheduling unit and/or a physical downlink data channel in at least one time domain scheduling unit after the first time domain scheduling unit.

Therefore, with the terminal device of an implementation of the present disclosure, a PDCCH can not only schedule resources of this time domain scheduling unit and its subsequent time domain scheduling unit, but also schedule partial resources of a previous time domain scheduling unit. In this way, PDSCH transmission resources of the beam can be expanded, without allocating a new time domain scheduling unit for the beam. The flexibility of resource scheduling is further improved.

It should be understood that the terminal device 500 according to an implementation of the present disclosure may correspond to the terminal device in the method 100 implementation of the present disclosure, and the above and other operations and/or functions of various units in the terminal device 500 are respectively for implementing corresponding flows of the terminal device in the method in FIG. 2, which will not be repeated here for sake of conciseness.

Figure 11:
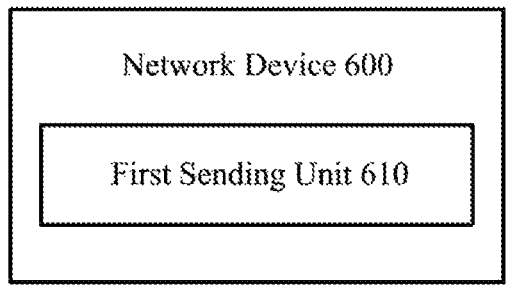
FIG. 11 shows a block diagram of a network device according to an implementation of the present disclosure.

FIG. 11 shows a block diagram of a network device 600 according to an implementation of the present disclosure. As shown in FIG. 11, the terminal device 600 includes a first sending unit 610.

The first sending unit 610 is used for sending a first physical downlink control channel to a terminal device in a first time domain scheduling unit, wherein the first physical downlink control channel is used for scheduling a physical downlink data channel in at least one time domain scheduling unit before the first time domain scheduling unit.

Therefore, with the network device in an implementation of the present disclosure, a PDCCH can not only schedule resources of this time domain scheduling unit and its subsequent time domain scheduling unit, but also schedule partial resources of a previous time domain scheduling unit. In this way, PDSCH transmission resources of the beam can be expanded, without allocating a new time domain scheduling unit for the beam. The flexibility of resource scheduling is further improved.

Optionally, in an implementation of the present disclosure, the network device 600 further includes: a second sending unit 620, used for sending indication information to the terminal device, wherein the indication information is used for indicating a position of the physical downlink data channel capable of being scheduled by the first physical downlink control channel in the at least one time domain scheduling unit.

Optionally, in an implementation of the present disclosure, the indication information is carried in Radio Resource Control (RRC) signaling.

Optionally, in an implementation of the present disclosure, the at least one time domain scheduling unit is a second time domain scheduling unit before and adjacent to the first time domain scheduling unit, the second time domain scheduling unit includes a second physical downlink control channel, the second time domain scheduling unit includes N symbols, and the physical downlink data channel capable of being scheduled by the first physical downlink control channel in the second time domain scheduling unit occupies N−M+1th to Nth symbols of the second time domain scheduling unit, which do not overlap with symbols occupied by the second physical downlink control channel, wherein N and M are both positive integers, and M≤N.

Optionally, in an implementation of the present disclosure, the first time domain scheduling unit includes a first synchronization signal block, the second time domain scheduling unit includes a second synchronization signal block, the first synchronization signal block is different from the second synchronization signal block, the second synchronization signal block occupies first to Pth symbols of the second time domain scheduling unit, and the second physical downlink control channel is located on at least one side of a bandwidth of the second synchronization signal block in the frequency domain, wherein P is a positive integer, and P≤(N−M).

Optionally, in an implementation of the present disclosure, the first time domain scheduling unit includes a first synchronization signal block, the first time domain scheduling unit includes Q symbols, the first synchronization signal block occupies Q−R+1th to Qth symbols of the first time domain scheduling unit, and the first physical downlink control channel occupies first to Sth symbols of the first time domain scheduling unit, wherein Q, R and S are all positive integers, and S≤(Q−R).

Optionally, in an implementation of the present disclosure, the first time domain scheduling unit is a time slot or a mini-time slot.

Optionally, in an implementation of the present disclosure, the first physical downlink control channel is further used for scheduling a physical downlink data channel in the first time domain scheduling unit and/or a physical downlink data channel in at least one time domain scheduling unit after the first time domain scheduling unit.

Therefore, with the network device in an implementation of the present disclosure, a PDCCH can not only schedule resources of this time domain scheduling unit and its subsequent time domain scheduling unit, but also schedule partial resources of a previous time domain scheduling unit. In this way, PDSCH transmission resources of the beam can be expanded, without allocating a new time domain scheduling unit for the beam. The flexibility of resource scheduling is further improved.

It should be understood that, the network device 600 in the implementation of the present disclosure may correspond to the network device in the method 300 implementation of the present disclosure, and the above and other operations and/or functions of various units in the network device 600 are respectively for implementing corresponding flows of the network device in the method in FIG. 8, which will not be repeated here for sake of conciseness.

Figure 12:
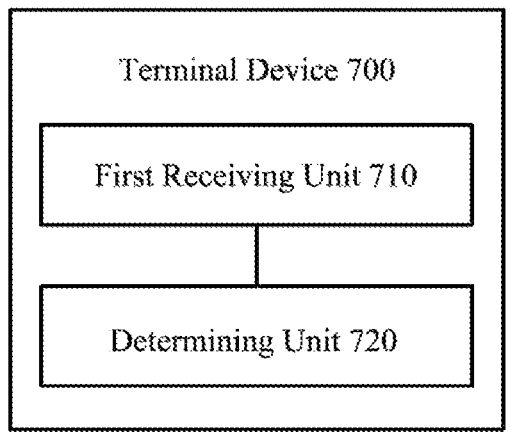
FIG. 12 shows another block diagram of a terminal device according to an implementation of the present disclosure.

FIG. 12 shows a block diagram of a terminal device 700 according to an implementation of the present disclosure. As shown in FIG. 12, the terminal device 700 includes a first receiving unit 710 and a determining unit 720.

The first receiving unit 710 is used for receiving first indication information and second indication information sent by a network device, wherein the first indication information is used for indicating a position of a first physical downlink control channel in a first time domain scheduling unit, the second indication information is used for indicating a position of a second physical downlink control channel in a second time domain scheduling unit, the first time domain scheduling unit includes a synchronization signal block, the second time domain scheduling unit does not include a synchronization signal block, and the synchronization signal block includes a synchronization signal and a physical broadcast channel.

The determining unit 720 is used for determining the position of the first physical downlink control channel in the first time domain scheduling unit and the position of the second physical downlink control channel in the second time domain scheduling unit respectively, according to the first indication information and the second indication information.

Optionally, in an implementation of the present disclosure, the first indication information and/or the second indication information is carried in a physical broadcast channel or a system message.

Optionally, in an implementation of the present disclosure, the first time domain scheduling unit includes N symbols, the synchronization signal block occupies first to Mth symbols in the first time domain scheduling unit, wherein N and M are both positive integers, and M≤N. And the terminal device 700 further includes: a second receiving unit 730, used for receiving the second physical downlink control channel in the second time domain scheduling unit, after receiving completely the synchronization signal block and the first physical downlink control channel in the first time domain scheduling unit.

Optionally, in an implementation of the present disclosure, the first time domain scheduling unit and/or the second time domain scheduling unit is a time slot or a mini-time slot.

Therefore, with the terminal device of an implementation of the present disclosure, a resource utilization rate can be improved, a transmission time of each beam can be shortened, a transmission delay can be reduced, and more beams can be accommodated while coverage requirements of NR high frequency bands are satisfied, thereby improving a capacity and coverage of a communication system.

It should be understood that, the terminal device 700 in the implementation of the present disclosure may correspond to the terminal device in the method 200 implementation of the present disclosure, and the above and other operations and/or functions of various units in the terminal device 700 are respectively for implementing corresponding flows of the terminal device in the method in FIG. 7, which will not be repeated here for sake of conciseness.

Figure 13:
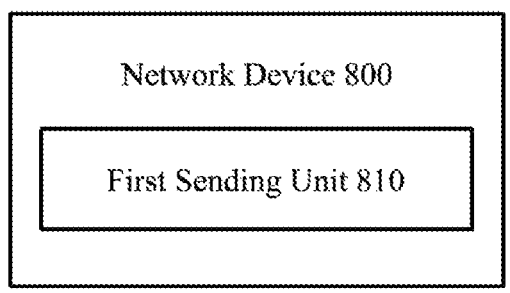
FIG. 13 shows another block diagram of a network device according to an implementation of the present disclosure.

FIG. 13 shows a block diagram of a network device 800 according to an implementation of the present disclosure. As shown in FIG. 13, the terminal device 800 includes a first sending unit 810.

The first sending unit 810 is used for sending first indication information and second indication information to a terminal device, wherein the first indication information is used for indicating a position of a first physical downlink control channel in a first time domain scheduling unit, the second indication information is used for indicating a position of a second physical downlink control channel in a second time domain scheduling unit, the first time domain scheduling unit includes a synchronization signal block, and the second time domain scheduling unit does not include a synchronization signal block.

Optionally, in an implementation of the present disclosure, the first indication information and/or the second indication information is carried in a physical broadcast channel or a system message.

Optionally, in an implementation of the present disclosure, the first time domain scheduling unit includes N symbols, the synchronization signal block occupies first to Mth symbols in the first time domain scheduling unit, wherein N and M are both positive integers, and M≤N. And the network device 800 further includes: a second transmitting unit 820, used for sending the second physical downlink control channel in the second time domain scheduling unit, after sending completely the synchronization signal block and the first physical downlink control channel in the first time domain scheduling unit.

Optionally, in an implementation of the present disclosure, the first time domain scheduling unit and/or the second time domain scheduling unit is a time slot or a mini-time slot.

Therefore, with the network device according to an implementation of the present disclosure, a resource utilization rate can be improved, a transmission time of each beam can be shortened, a transmission delay can be reduced, and more beams can be accommodated while coverage requirements of NR high frequency bands are satisfied, thereby improving a capacity and coverage of a communication system.

It should be understood that, the network device 800 in an implementation of the present disclosure may correspond to the network device in the method 400 implementation of the present disclosure, and the above and other operations and/or functions of various units in the network device 800 are respectively for implementing corresponding flows of the network device in the method in FIG. 9, which will not be repeated here for sake of conciseness.

Figure 14:
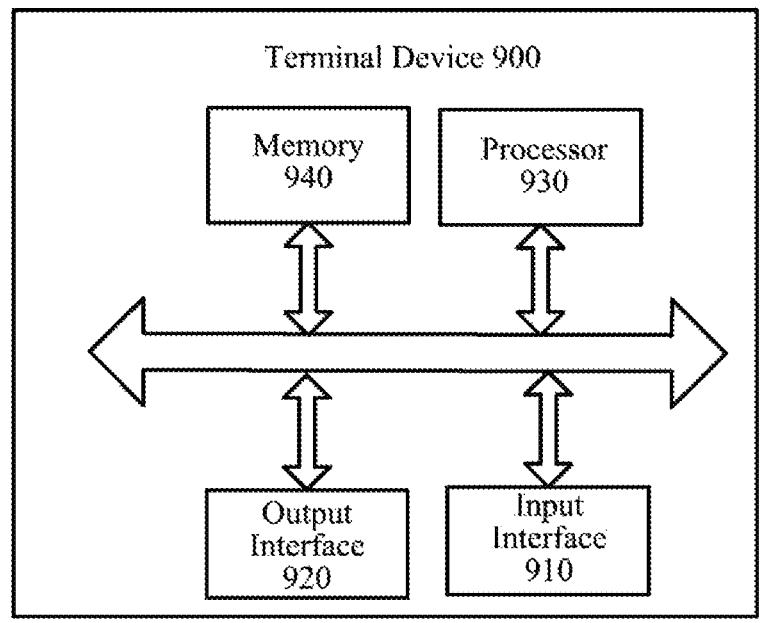
FIG. 14 shows yet another block diagram of a terminal device according to an implementation of the present disclosure.

As shown in FIG. 14, an implementation of the present disclosure further provides a terminal device 900. The terminal device 900 may be the terminal device 500 in FIG. 10, which may be used for performing contents of the terminal device corresponding to the method 100 in FIG. 2. The terminal device 900 includes an input interface 910, an output interface 920, a processor 930, and a memory 940. The input interface 910, the output interface 920, the processor 930, and the memory 940 may be connected through a bus system. The memory 940 is used for storing programs, instructions or codes. The processor 930 is used for executing the programs, the instructions or the codes in the memory 940 to control the input interface 910 to receive signals, control the output interface 920 to send signals, and accomplish operations in the foregoing method implementations.

Therefore, with the terminal device of an implementation of the present disclosure, a PDCCH can not only schedule resources of this time domain scheduling unit and its subsequent time domain scheduling unit, but also schedule partial resources of a previous time domain scheduling unit. In this way, PDSCH transmission resources of the beam can be expanded, without allocating a new time domain scheduling unit for the beam. The flexibility of resource scheduling is further improved.

It should be understood that in an implementation of the present disclosure, the processor 930 may be a Central Processing Unit (CPU), or the processor 930 may be other general purpose processor, digital signal processor, application specific integrated circuit, field programmable gate array or other programmable logic device, discrete gate or transistor logic device, discrete hardware component, etc. The general purpose processor may be a microprocessor, or the processor may be any conventional processor or the like.

The memory 940 may include a read only memory and a random access memory and provide instructions and data to the processor 930. A portion of memory 940 may also include a non-volatile random access memory. For example, the memory 940 may also store device type information.

In an implementation process, various contents of the methods described above may be accomplished by integrated logic circuits of hardware in the processor 930 or instructions in the form of software. The contents of the method disclosed in connection with an implementation of the present disclosure can be directly embodied by the execution of the hardware processor or by the execution of the combination of hardware and software modules in the processor. The software modules may be located in typical storage medium in the art, such as a random access memory, flash memory, read-only memory, programmable read-only memory or electrically erasable programmable memory, or register. The storage medium is located in the memory 940, and the processor 930 reads the information in the memory 940, and accomplishes the contents of the above method in combination with its hardware. In order to avoid repetition, it will not be described in detail here.

In a specific implementation, the caching unit 530 in the terminal device 500 may be implemented by the processor 930 in FIG. 14, and the first receiving unit 510, the second receiving unit 520, and the third receiving unit 540 in the terminal device 500 may be implemented by the input interface 910 in FIG. 14.

Figure 15:
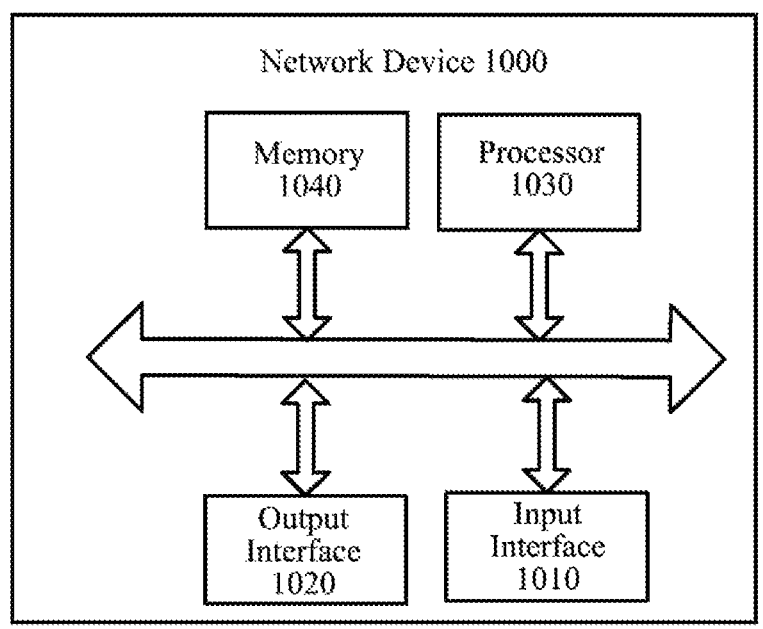
FIG. 15 shows yet another block diagram of a network device according to an implementation of the present disclosure.

As shown in FIG. 15, an implementation of the present disclosure further provides a network device 1000. The network device 1000 may be the network device 600 in FIG. 11, which may be used for performing contents of the network device corresponding to the method 300 in FIG. 8. The network device 1000 includes an input interface 1010, an output interface 1020, a processor 1030, and a memory 1040. The input interface 1010, the output interface 1020, the processor 1030, and the memory 1040 may be connected through a bus system. The memory 1040 is used for storing programs, instructions or codes. The processor 1030 is used for executing the programs, the instructions or the codes in the memory 1040 to control the input interface 1010 to receive signals, control the output interface 1020 to send signals, and accomplish operations in the method implementations described above.

Therefore, with the network device in an implementation of the present disclosure, a PDCCH can not only schedule resources of this time domain scheduling unit and its subsequent time domain scheduling unit, but also schedule partial resources of a previous time domain scheduling unit. In this way, PDSCH transmission resources of the beam can be expanded, without allocating a new time domain scheduling unit for the beam. The flexibility of resource scheduling is further improved.

It should be understood that in an implementation of the present disclosure, the processor 1030 may be a Central Processing Unit (CPU), or the processor 1030 may be other general purpose processor, digital signal processor, application specific integrated circuit, field programmable gate array or other programmable logic device, discrete gate or transistor logic device, discrete hardware component, etc. The general purpose processor may be a microprocessor, or the processor may be any conventional processor or the like.

The memory 1040 may include a read only memory and a random access memory and provide instructions and data to the processor 1030. A portion of memory 1040 may also include a non-volatile random access memory. For example, the memory 1040 may also store device type information.

In an implementation process, various contents of the methods described above may be accomplished by integrated logic circuits of hardware in the processor 1030 or instructions in the form of software. The contents of the method disclosed in connection with an implementation of the present disclosure can be directly embodied by the execution of the hardware processor or by the execution of the combination of hardware and software modules in the processor. The software modules may be located in typical storage medium in the art, such as a random access memory, flash memory, read-only memory, programmable read-only memory or electrically erasable programmable memory, or register. The storage medium is located in the memory 1040, and the processor 1030 reads the information in the memory 1040, and accomplishes the contents of the above method in combination with its hardware. In order to avoid repetition, it will not be described in detail here.

In a specific implementation, the first transmitting unit 610 and the second transmitting unit 620 in the network device 600 may be implemented by the output interface 1020 in FIG. 15.

Figure 16:
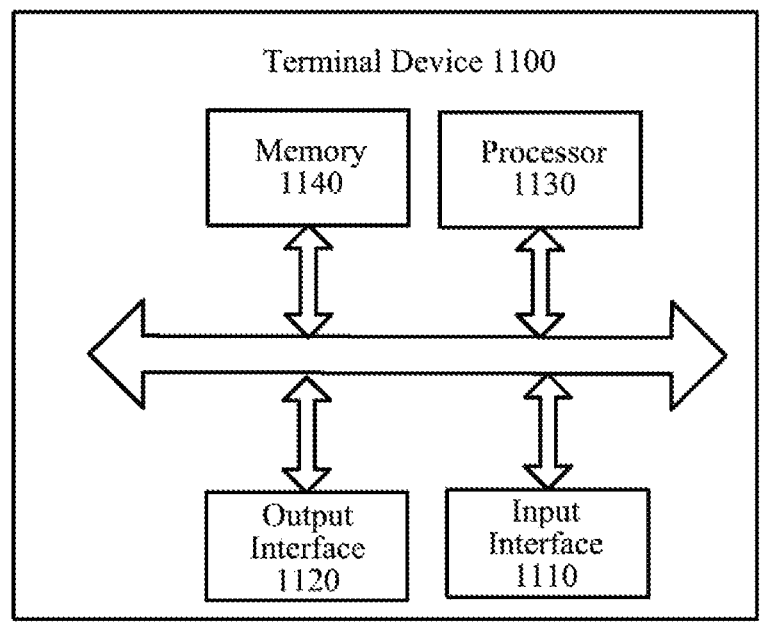
FIG. 16 shows yet another block diagram of a terminal device according to an implementation of the present disclosure.

As shown in FIG. 16, an implementation of the present disclosure further provides a terminal device 1100. The terminal device 1100 may be the terminal device 700 in FIG. 12, which may be used for performing contents of the terminal device corresponding to the method 200 in FIG. 7. The terminal device 1100 includes an input interface 1110, an output interface 1120, a processor 1130, and a memory 1140. The input interface 1110, the output interface 1120, the processor 1130, and the memory 1140 may be connected through a bus system. The memory 1140 is used for storing programs, instructions or codes. The processor 1130 is used for executing the programs, the instructions or the codes in the memory 1140 to control the input interface 1110 to receive signals, control the output interface 1120 to send signals, and accomplish operations in the foregoing method implementations.

Therefore, with the terminal device of an implementation of the present disclosure, a resource utilization rate can be improved, a transmission time of each beam can be shortened, a transmission delay can be reduced, and more beams can be accommodated while coverage requirements of NR high frequency bands are satisfied, thereby improving a capacity and coverage of a communication system.

It should be understood that in an implementation of the present disclosure, the processor 1130 may be a Central Processing Unit (CPU), or the processor 1130 may be other general purpose processor, digital signal processor, application specific integrated circuit, field programmable gate array or other programmable logic device, discrete gate or transistor logic device, discrete hardware component, etc. The general purpose processor may be a microprocessor, or the processor may be any conventional processor or the like.

The memory 1140 may include a read only memory and a random access memory and provide instructions and data to the processor 1130. A portion of memory 1140 may also include a non-volatile random access memory. For example, the memory 1140 may also store device type information.

In an implementation process, various contents of the methods described above may be accomplished by integrated logic circuits of hardware in the processor 1130 or instructions in the form of software. The contents of the method disclosed in connection with an implementation of the present disclosure can be directly embodied by the execution of the hardware processor or by the execution of the combination of hardware and software modules in the processor. The software modules may be located in typical storage medium in the art, such as a random access memory, flash memory, read-only memory, programmable read-only memory or electrically erasable programmable memory, or register. The storage medium is located in the memory 1140, and the processor 1130 reads the information in the memory 1140, and accomplishes the contents of the above method in combination with its hardware. In order to avoid repetition, it will not be described in detail here.

In a specific implementation, the determining unit 720 in the terminal device 700 may be implemented by the processor 1130 in FIG. 16, and the first receiving unit 710 and the second receiving unit 730 in the terminal device 700 may be implemented by the input interface 1110 in FIG. 16.

Figure 17:
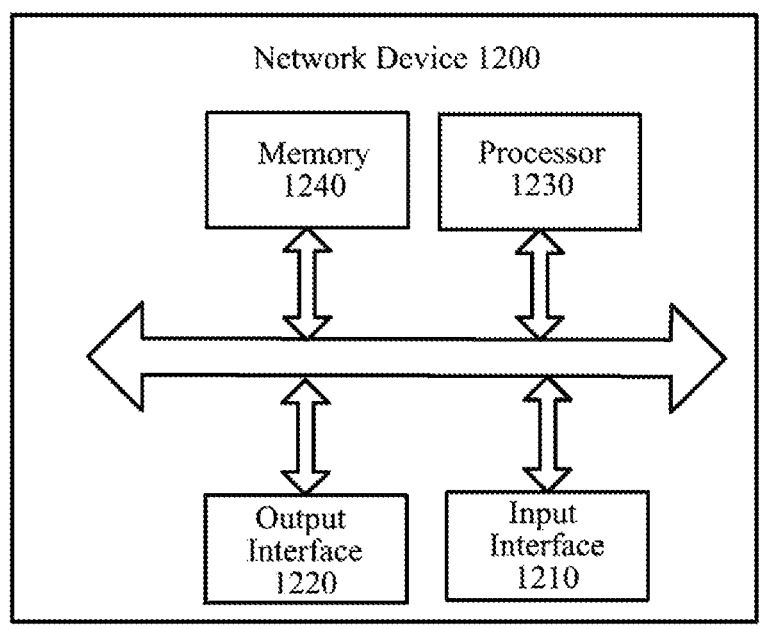
FIG. 17 shows yet another block diagram of a network device according to an implementation of the present disclosure.

As shown in FIG. 17, implementations of the present disclosure further provide a network device 1200. The network device 1200 may be the network device 800 in FIG. 13, which may be used for performing contents of the network device corresponding to the method 400 in FIG. 9. The network device 1200 includes an input interface 1210, an output interface 1220, a processor 1230, and a memory 1240. The input interface 1210, the output interface 1220, the processor 1230, and the memory 1240 may be connected through a bus system. The memory 1240 is used for storing programs, instructions or codes. The processor 1230 is used for executing the programs, the instructions or the codes in the memory 1240 to control the input interface 1210 to receive signals, control the output interface 1220 to send signals, and accomplish operations in the foregoing method implementations.

Therefore, with the network device according to an implementation of the present disclosure, a resource utilization rate can be improved, a transmission time of each beam can be shortened, a transmission delay can be reduced, and more beams can be accommodated while coverage requirements of NR high frequency bands are satisfied, thereby improving a capacity and coverage of a communication system.

It should be understood that in an implementation of the present disclosure, the processor 1230 may be a Central Processing Unit (CPU), or the processor 1230 may be other general purpose processor, digital signal processor, application specific integrated circuit, field programmable gate array or other programmable logic device, discrete gate or transistor logic device, discrete hardware component, etc. The general purpose processor may be a microprocessor, or the processor may be any conventional processor or the like.

The memory 1240 may include a read only memory and a random access memory and provide instructions and data to the processor 1230. A portion of memory 1240 may also include a non-volatile random access memory. For example, the memory 1240 may also store device type information.

In an implementation process, various contents of the methods described above may be accomplished by integrated logic circuits of hardware in the processor 1230 or instructions in the form of software. The contents of the method disclosed in connection with an implementation of the present disclosure can be directly embodied by the execution of the hardware processor or by the execution of the combination of hardware and software modules in the processor. The software modules may be located in typical storage medium in the art, such as a random access memory, flash memory, read-only memory, programmable read-only memory or electrically erasable programmable memory, or register. The storage medium is located in the memory 1240, and the processor 1230 reads the information in the memory 1240, and accomplishes the contents of the above method in combination with its hardware. In order to avoid repetition, it will not be described in detail here.

In a specific implementation, the first transmission unit 810 and the second transmission unit 820 in the network device 800 may be implemented by the output interface 1220 in FIG. 17.

Those of ordinary skill in the art will recognize that the exemplary elements and algorithm acts described in connection with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be determined to be beyond the scope of the present disclosure.

Those skilled in the art can clearly understand that for convenience and conciseness of description, the specific working processes of the system, apparatus and unit described above may refer to the corresponding processes in the aforementioned method implementations and will not be described here.

In several implementations provided by the present disclosure, it should be understood that the disclosed systems, apparatuses and methods may be implemented in other ways. For example, the apparatus implementation described above is only illustrative, for example, the division of the unit is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if implemented in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device) to perform all or part of the acts of the method described in various implementations of the present disclosure. The aforementioned storage medium includes various media capable of storing program codes, such as a U disk, a mobile hard disk, a read-only memory (ROM), a random access memory (RAM), a magnetic disk, or an optical disk.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be subject to the protection scope of the claims.

What I claim is:

1. A communication method, comprising:
    receiving, by a terminal device, a first physical downlink control channel sent by a network device in a first time domain scheduling unit, wherein the first physical downlink control channel is used for scheduling a physical downlink data channel in at least one time domain scheduling unit before the first time domain scheduling unit; and
    receiving, by the terminal device, data corresponding to the first physical downlink control channel in the at least one time domain scheduling unit according to the first physical downlink control channel,
    wherein the at least one time domain scheduling unit is a second time domain scheduling unit before and adjacent to the first time domain scheduling unit, the second time domain scheduling unit comprises a second physical downlink control channel, the second time domain scheduling unit comprises N symbols, and the physical downlink data channel capable of being scheduled by the first physical downlink control channel in the second time domain scheduling unit occupies N−M+1th to Nth symbols of the second time domain scheduling unit, which do not overlap with symbols occupied by the second physical downlink control channel, wherein N and M are both positive integers, and M≤N),
    wherein the first time domain scheduling unit comprises a first synchronization signal block, the first time domain scheduling unit comprises Q symbols, the first synchronization signal block occupies Q−R+1th to Qth symbols of the first time domain scheduling unit, and the first physical downlink control channel occupies first to Sth symbols of the first time domain scheduling unit, wherein Q, R, and S are all positive integers, and S≤(Q−R).

2. The communication method of claim 1, wherein downlink control information carried on the first physical downlink control channel is used for indicating that the physical downlink data channel scheduled by the first physical downlink control channel is located in the at least one time domain scheduling unit before the first time domain scheduling unit, and the method further comprises:
    caching, by the terminal device, data carried on the physical downlink data channel capable of being scheduled by the first physical downlink control channel in the at least one time domain scheduling unit; and
    wherein receiving, by the terminal device, the data corresponding to the first physical downlink control channel in the at least one time domain scheduling unit according to the first physical downlink control channel, comprises:
    receiving, by the terminal device, the data corresponding to the first physical downlink control channel from the data carried on the physical downlink data channel capable of being scheduled by the first physical downlink control channel in the at least one time domain scheduling unit cached by the terminal device, according to the first physical downlink control channel.

3. The communication method of claim 2, wherein the method further comprises:
receiving, by the terminal device, indication information sent by the network device, wherein the indication information is used for indicating a position of the physical downlink data channel capable of being scheduled by the first physical downlink control channel in the at least one time domain scheduling unit; and
wherein caching, by the terminal device, the data carried on the physical downlink data channel capable of being scheduled by the first physical downlink control channel in the at least one time domain scheduling unit, comprises:
caching, by the terminal device, the data carried on the physical downlink data channel capable of being scheduled by the first physical downlink control channel in the at least one time domain scheduling unit, according to the indication information.

4. The communication method of claim 3, wherein the indication information is carried in Radio Resource Control (RRC) signaling.

5. The communication method of claim 1, wherein the first time domain scheduling unit comprises a first synchronization signal block, the second time domain scheduling unit comprises a second synchronization signal block, the first synchronization signal block is different from the second synchronization signal block, the second synchronization signal block occupies first to Pth symbols of the second time domain scheduling unit, and the second physical downlink control channel is located on at least one side of a bandwidth of the second synchronization signal block in the frequency domain, wherein P is a positive integer, and P≤(N−M).

6. The communication method of claim 1, wherein the first time domain scheduling unit is a time slot or a mini-time slot.

7. The communication method of claim 1, wherein the first physical downlink control channel is further used for scheduling a physical downlink data channel in at least one of the first time domain scheduling unit or a physical downlink data channel in at least one time domain scheduling unit after the first time domain scheduling unit.

8. A communication method, comprising:
receiving, by a terminal device, first indication information and second indication information sent by a network device, wherein the first indication information is used for indicating a position of a first physical downlink control channel in a first time domain scheduling unit, the second indication information is used for indicating a position of a second physical downlink control channel in a second time domain scheduling unit, the first time domain scheduling unit comprises a synchronization signal block, the second time domain scheduling unit does not comprise a synchronization signal block, and the synchronization signal block comprises a synchronization signal and a physical broadcast channel; and
determining, by the terminal device, the position of the first physical downlink control channel in the first time domain scheduling unit and the position of the second physical downlink control channel in the second time domain scheduling unit respectively, according to the first indication information and the second indication information,
wherein the at least one time domain scheduling unit is a second time domain scheduling unit before and adjacent to the first time domain scheduling unit, the second time domain scheduling unit comprises a second physical downlink control channel, the second time domain scheduling unit comprises N symbols, and the physical downlink data channel capable of being scheduled by the first physical downlink control channel in the second time domain scheduling unit occupies N−M+1th to Nth symbols of the second time domain scheduling unit, which do not overlap with symbols occupied by the second physical downlink control channel, wherein N and M are both positive integers, and M≤N,
wherein the first time domain scheduling unit comprises a first synchronization signal block, the first time domain scheduling unit comprises Q symbols, the first synchronization signal block occupies Q−R+1th to Qth symbols of the first time domain scheduling unit, and the first physical downlink control channel occupies first to Sth symbols of the first time domain scheduling unit, wherein Q, R, and S are all positive integers, and S≤(Q−R).

9. The communication method of claim 8, wherein at least one of the first indication information or the second indication information is carried in a physical broadcast channel or a system message.

10. The communication method of claim 8, wherein the first time domain scheduling unit comprises N symbols, the synchronization signal block occupies first to Mth symbols in the first time domain scheduling unit, wherein N and M are both positive integers, and M≤N, and the method further comprises:
receiving, by the terminal device, the second physical downlink control channel in the second time domain scheduling unit, after receiving completely, by the terminal device, the synchronization signal block and the first physical downlink control channel in the first time domain scheduling unit.

11. The communication method of claim 8, wherein at least one of the first time domain scheduling unit or the second time domain scheduling unit is a time slot or a mini-time slot.

12. A terminal device, comprising: a memory, a processor, and an input interface, wherein the memory is used for storing instructions, and the processor is used for executing the instructions stored in the memory, when the processor executes the instructions stored in the memory, the execution causes the processor to control the input interface to:
receive a first physical downlink control channel sent by a network device in a first time domain scheduling unit, wherein the first physical downlink control channel is used for scheduling a physical downlink data channel in at least one time domain scheduling unit before the first time domain scheduling unit; and receive data corresponding to the first physical downlink control channel in the at least one time domain scheduling unit, according to the first physical downlink control channel, wherein the at least one time domain scheduling unit is a second time domain scheduling unit before and adjacent to the first time domain scheduling unit, the second time domain scheduling unit comprises a second physical downlink control channel, the second time domain scheduling unit comprises N symbols, and the physical downlink data channel capable of being scheduled by the first physical downlink control channel in the second time domain scheduling unit occupies N−M+1th to Nth symbols of the second time domain scheduling unit, which do not overlap with symbols occupied by the second physical downlink control channel, wherein N and M are both positive integers, and M≤N, wherein the first time domain scheduling unit comprises a first synchronization signal block, the first time domain scheduling unit comprises Q symbols, the first synchronization signal block occupies Q−R+1th to Qth symbols of the first time domain scheduling unit, and the first physical downlink control channel occupies first to Sth symbols of the first time domain scheduling unit, wherein Q, R, and S are all positive integers, and S≤(Q−R).

13. The terminal device of claim 12, wherein downlink control information carried on the first physical downlink control channel is used for indicating that the physical downlink data channel scheduled by the first physical downlink control channel is located in the at least one time domain scheduling unit before the first time domain scheduling unit, and when the processor executes the instructions stored in the memory, the execution causes the processor further to:

cache data carried on the physical downlink data channel capable of being scheduled by the first physical downlink control channel in the at least one time domain scheduling unit; and wherein when the processor executes the instructions stored in the memory, the execution causes the processor specifically to control the input interface to:

receive the data corresponding to the first physical downlink control channel from the data carried on the physical downlink data channel capable of being scheduled by the first physical downlink control channel in the at least one time domain scheduling unit cached by the terminal device, according to the first physical downlink control channel.

14. The terminal device of claim 13, wherein when the processor executes the instructions stored in the memory, the execution causes the processor further to control the input interface to:

receive indication information sent by the network device, wherein the indication information is used for indicating a position of the physical downlink data channel capable of being scheduled by the first physical downlink control channel in the at least one time domain scheduling unit; and wherein when the processor executes the instructions stored in the memory, the execution causes the processor specifically to:

cache the data carried on the physical downlink data channel capable of being scheduled by the first physical downlink control channel in the at least one time domain scheduling unit, according to the indication information.

15. The terminal device of claim 14, wherein the indication information is carried in Radio Resource Control (RRC) signaling.

16. The terminal device of claim 12, wherein the first time domain scheduling unit comprises a first synchronization signal block, the second time domain scheduling unit comprises a second synchronization signal block, the first synchronization signal block is different from the second synchronization signal block, the second synchronization signal block occupies first to Pth symbols of the second time domain scheduling unit, and the second physical downlink control channel is located on at least one side of a bandwidth of the second synchronization signal block in the frequency domain, wherein P is a positive integer, and P≤(N−M).

17. The terminal device of claim 12, wherein the first time domain scheduling unit is a time slot or a mini-time slot.

18. The terminal device of claim 12, wherein the first physical downlink control channel is further used for scheduling a physical downlink data channel in at least one of the first time domain scheduling unit or a physical downlink data channel in at least one time domain scheduling unit after the first time domain scheduling unit.

19. A terminal device, comprising: a memory, a processor, and an input interface, wherein the memory is used for storing instructions, and the processor is used for executing the instructions stored in the memory, when the processor executes the instructions stored in the memory, the execution causes the processor to:

control the input interface to receive first indication information and second indication information sent by a network device, wherein the first indication information is used for indicating a position of a first physical downlink control channel in a first time domain scheduling unit, the second indication information is used for indicating a position of a second physical downlink control channel in a second time domain scheduling unit, the first time domain scheduling unit comprises a synchronization signal block, and the second time domain scheduling unit does not comprise a synchronization signal block, and the synchronization signal block comprises a synchronization signal and a physical broadcast channel; and determine the position of the first physical downlink control channel in the first time domain scheduling unit and the position of the second physical downlink control channel in the second time domain scheduling unit respectively, according to the first indication information and the second indication information, wherein the at least one time domain scheduling unit is a second time domain scheduling unit before and adjacent to the first time domain scheduling unit, the second time domain scheduling unit comprises a second physical downlink control channel, the second time domain scheduling unit comprises N symbols, and the physical downlink data channel capable of being scheduled by the first physical downlink control channel in the second time domain scheduling unit occupies N−M+1th to Nth symbols of the second time domain scheduling unit, which do not overlap with symbols occupied by the second physical downlink control channel, wherein N and M are both positive integers, and M≤N, wherein the first time domain scheduling unit comprises a first synchronization signal block, the first time domain scheduling unit comprises Q symbols, the first synchronization signal block occupies Q−R+1th to Qth symbols of the first time domain scheduling unit, and the first physical downlink control channel occupies first to Sth symbols of the first time domain scheduling unit, wherein Q, R, and S are all positive integers, and S≤(Q−R).

20. The terminal device of claim 19, wherein at least one of the first indication information or the second indication information is carried in a physical broadcast channel or a system message.

21. The terminal device of claim 19, wherein the first time domain scheduling unit comprises N symbols, the synchronization signal block occupies first to Mth symbols in the first time domain scheduling unit, wherein N and M are both positive integers, and M≤N, and when the processor executes the instructions stored in the memory, the execution causes the processor further to control the input interface to:
    receive the second physical downlink control channel in the second time domain scheduling unit, after receiving completely the synchronization signal block and the first physical downlink control channel in the first time domain scheduling unit.

22. The terminal device of claim 19, wherein at least one of the first time domain scheduling unit or the second time domain scheduling unit is a time slot or a mini-time slot.

* * * * *